United States Patent
Balkan et al.

(10) Patent No.: US 9,495,318 B2
(45) Date of Patent: Nov. 15, 2016

(54) SYNCHRONIZING TRANSACTIONS FOR A SINGLE MASTER OVER MULTIPLE BUSSES

(71) Applicant: Apple Inc., Cupertino, CA (US)

(72) Inventors: Deniz Balkan, Santa Clara, CA (US); Gurjeet S. Saund, Saratoga, CA (US); Jim J. Lin, Saratoga, CA (US); Timothy R. Paaske, Cupertino, CA (US); Ben D. Jarrett, Austin, TX (US)

(73) Assignee: Apple Inc., Cupertino, CA (US)

( * ) Notice: Subject to any disclaimer, the term of this patent is extended or adjusted under 35 U.S.C. 154(b) by 452 days.

(21) Appl. No.: 14/089,237

(22) Filed: Nov. 25, 2013

(65) Prior Publication Data

US 2015/0149673 A1    May 28, 2015

(51) Int. Cl.
*G06F 13/00* (2006.01)
*G06F 13/40* (2006.01)
*G06F 13/362* (2006.01)
*G06F 13/364* (2006.01)

(52) U.S. Cl.
CPC ........... *G06F 13/405* (2013.01); *G06F 13/362* (2013.01); *G06F 13/364* (2013.01); *G06F 13/4027* (2013.01)

(58) Field of Classification Search
USPC ................. 710/104–110, 305–315
See application file for complete search history.

(56) References Cited

U.S. PATENT DOCUMENTS

| | | | |
|---|---|---|---|
| 5,826,089 A | 10/1998 | Ireton | |
| 6,611,891 B1* | 8/2003 | Hewitt | G06F 13/4027 710/104 |
| 6,675,248 B1* | 1/2004 | Olarig | G06F 13/385 710/305 |
| 6,754,751 B1* | 6/2004 | Willke | G06F 13/1621 710/112 |
| 6,910,090 B1 | 6/2005 | Scheel et al. | |
| 6,976,115 B2* | 12/2005 | Creta | G06F 13/4031 710/310 |
| 7,328,300 B2* | 2/2008 | Bennett | G06F 13/28 710/112 |
| 7,783,820 B2 | 8/2010 | Shelton et al. | |
| 7,975,092 B2 | 7/2011 | Xiong | |
| 2004/0068602 A1* | 4/2004 | Olarig | G06F 13/385 710/306 |

* cited by examiner

*Primary Examiner* — Raymond Phan
(74) *Attorney, Agent, or Firm* — Meyertons, Hood, Kivlin, Kowert & Goetzel, P.C.

(57) ABSTRACT

Embodiments of a bridge unit and system are disclosed that may allow for processing fence commands send to multiple bridge units. Each bridge unit may process a respective portion of a plurality of transactions generated by a master unit. The master unit may be configured to send a fence command to each bridge unit, which may stall the processing of the command. Each bridge unit may be configured to determine if all transactions included in its respective portion of the plurality of transactions has completed. Once each bridge unit has determined that all other bridge units have received the fence command and that all other bridge units have completed their respective portions of the plurality of transactions that were received prior to receiving the fence command, all bridge units may execute the fence command.

19 Claims, 5 Drawing Sheets

SYNCHRONIZING TRANSACTIONS FOR A SINGLE MASTER OVER MULTIPLE BUSSES

BACKGROUND

1. Technical Field

This invention is related to the field of integrated circuit implementation, and more particularly to the implementation of synchronizing transactions for a single master over multiple busses.

2. Description of the Related Art

Computing systems may include one or more systems on a chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Each functional block included within an SoC may be designed in accordance to one of various design flows. The logical operation of some functional blocks may be described in a high-level computer language such as, e.g., Very-high-speed integrated circuit hardware description language (VHDL). Logic gate implementations of blocks described in such a fashion may be generated using logic synthesis and place-and-route design techniques. Other functional blocks, such as memories, phase-locked loops (PLLs), analog-to-digital converters (ADCs), may be designed in a full-custom fashion.

Functional blocks within an SoC may be connected to one another through a bus. Such busses may employ proprietary communications protocols or they may employ one or more of various industry-standard communication protocols. Some SoC implementations may allow for multiple communication protocols to be employed between the various functional blocks included within the SoC.

SUMMARY OF THE EMBODIMENTS

Various embodiments of a bridge circuit are disclosed. Broadly speaking, a circuit and a method are contemplated in which a master unit may be configured to generate a plurality of transactions and first and second bridge units may be configured to process respective first and second portions of the plurality of transactions. The master unit may be further configured to transmit a fence command to the first and second bridge units. The first bridge unit may be further configured to stall the processing of the fence command and execute the fence command responsive to a determination that the first portion and the second portion of the plurality of transactions have completed, and the second bridge unit may be further configured to stall the processing of the fence command and execute the fence command responsive to a determination that the first portion and the second portion of the plurality of transactions have completed.

In another embodiment, to stall the processing of the fence command the first bridge unit may be further configured to assert a first fence received signal. The second bridge unit may be further configured to assert a second fence received signal to stall the processing of the fence command.

In a further embodiment, to stall the processing of the received fence command the first bridge unit may be further configured to assert a first stall signal in response to a determination that at least one transaction of the first portion of the plurality of transactions is pending. The second bridge unit may be further configured to assert a second stall signal in response to a determination that at least one transaction of the second portion of the plurality of transaction is pending to stall the processing of the received fence command.

BRIEF DESCRIPTION OF THE DRAWINGS

The following detailed description makes reference to the accompanying drawings, which are now briefly described.

Figure 1:
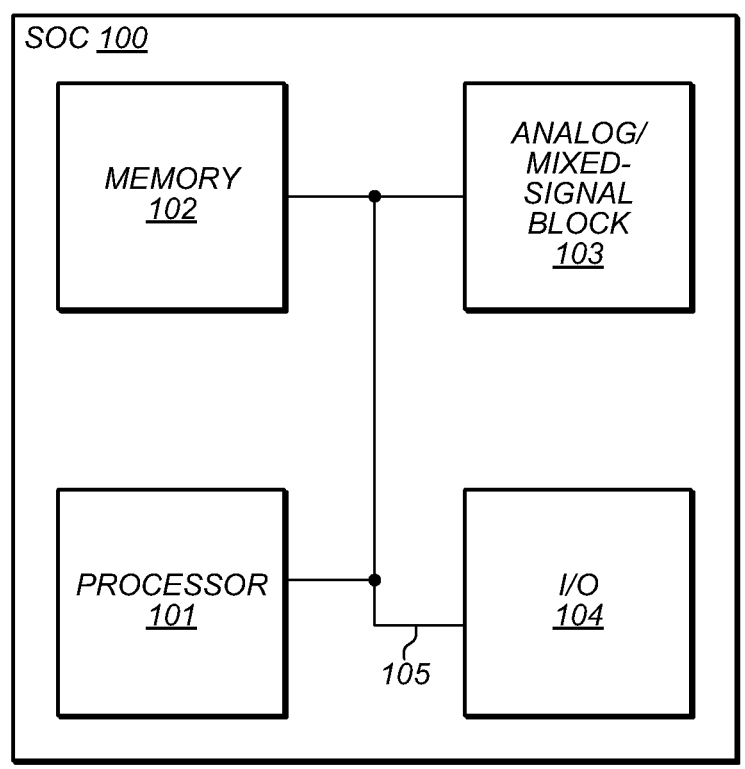
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Some functional blocks may be designed using a full-custom design methodology, while other functional blocks may be implemented using logic synthesis and place-and-route. In some embodiments, some functional blocks may be re-used from a previous SoC design, while other may be designed for a specific task for a given SoC. Other functional blocks may be purchased from third party vendors for inclusion in an SoC design.

To implement an SoC, the various included functional blocks may be designed to communicate with one another. In some embodiments, the communication may be a point-to-point bus, which may allow two or more functional blocks to communicate with each other. Some embodiments, however, may include functional blocks whose functionality is shared by amongst the other functional blocks included on the SoC. To accommodate the sharing of functional blocks, a common communication bus may be employed.

In various embodiments, different functional blocks may employ different communication protocols. Some embodiments may employ bridge circuits to translate transactions from one communication protocol to another. A functional block may, in some embodiments, transmit transactions over multiple busses to other functional blocks within a system. The functional block may include logic to determine how to route, i.e., select a bus, a given transactions. In such cases, it may be necessary to synchronize transactions at various points in time to ensure that a proper precedence order of transactions is maintained. A fence command (also referred to herein as "barrier command") may be used to provide a synchronization point. The embodiments illustrated in the drawings and described below may provide techniques for managing transactions issued from a single function block to multiple busses when a fence command is transmitted.

A block diagram of an SoC is illustrated in FIG. 1. In the illustrated embodiment, the SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include one or more register files and memories.

In some embodiments, processor 101 may implement any suitable instruction set architecture (ISA), such as, e.g., the ARM™, PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, or a Ferroelectric Random Access Memory (FeRAM), for example. In some embodiments, memory block 102 may be configured to store program code or program instructions that may be executed by processor 101. Memory block 102 may, in other embodiments, be configured to store data to be processed, such as graphics data, for example.

It is noted that in the embodiment of an SoC illustrated in FIG. 1, a single memory block is depicted. In other embodiments, any suitable number of memory blocks and memory types may be employed.

Analog/mixed-signal block 103 may include a variety of circuits including, for example, a crystal oscillator, a phase-locked loop (PLL) or delay-locked loop (DLL), an analog-to-digital converter (ADC), and a digital-to-analog converter (DAC) (all not shown). In other embodiments, analog/mixed-signal block 103 may be configured to perform power management tasks with the inclusion of on-chip power supplies, voltage regulators, and clock frequency scaling circuitry. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol or IEEE 1394 (Firewire®) protocol, and may allow for program code and/or program instructions to be transferred from a peripheral storage device for execution by processor 101.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Figure 2:
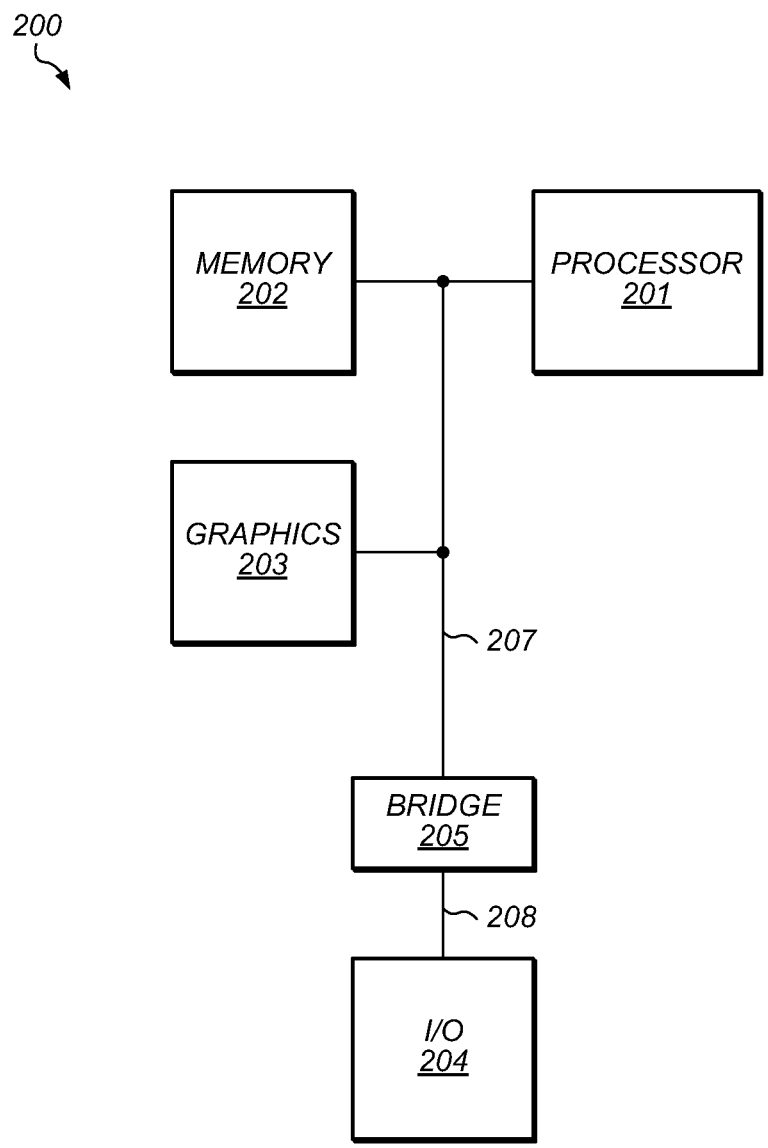
FIG. 2 illustrates another embodiment of a system-on-a-chip.

Turning to FIG. 2, another embodiment of an SoC is illustrated. In the illustrated embodiment, SoC 200 includes processor 201 coupled to memory 202, graphics controller 203, and bridge circuit 205 through bus 207. Bridge circuit 205 is further coupled to I/O block 204. Although only one bridge circuit is illustrated in SoC 200, in other embodiments, multiple bridge circuits with corresponding error circuits and functional blocks may be employed.

Functional blocks of an SoC may communicate with other functional blocks by sending commands and data (collectively referred to as "transactions") over a bus, such as bus 207. Such transaction may include, without limitation, read and write memory requests, and read and write peripheral input/output (PIO). A functional block may be configured as a master device or a slave device on the bus. A master device may be configured to initiate a transaction on the bus, while a slave device may be configured to only respond to requests. In some embodiments, there may be more than one device configured as a master connected to a bus.

Transactions on a bus, such as, e.g., bus 207 and bus 208, may be encoded by one of various communication protocols. In some embodiments, different busses within an SoC may employ different communication protocols. For example, in SoC 200, bus 208 may encode transactions using one such communication protocol, while bus 207 may employ another communication protocol. Although SoC 200 shows two busses, it is noted that in other embodiments, additional busses with various communication protocols may be employed.

When multiple busses with different communication protocols are employed in an SoC, it may be necessary to convert transactions encoded with one communication protocol to another communication protocol. For example, in order for processor 201 to issue a PIO read or write request to I/O block 204, the request must be converted from the communication protocol employed on bus 207 to the communication protocol employed on bus 208. In some embodiments, the conversion may be performed by a bridge circuit, such as bridge circuit 205, for example.

Bridge circuit 205 may, in various embodiments, be configured to translate a received transaction encoded with a communication protocol into a different communication protocol. In some embodiments, bridge circuit 205 may be further configured to translate responses received from an agent or functional block back into the communication protocol of the original transaction.

Bridge circuits or units, such as, e.g., bridge circuit 205, may be configured to receive and process multiple transactions from a functional block. In such cases, a bridge circuit may be configured to track a number of received transactions. A bridge circuit may also be configured to track a number of responses received from destination agents or functional blocks in order to determine a number of outstanding transactions, i.e., transactions for which a response has not been received.

It is noted that the SoC illustrated in FIG. 2 is merely an example. In other embodiments, different numbers of functional blocks, and different numbers of interface types are possible and contemplated.

Figure 3:
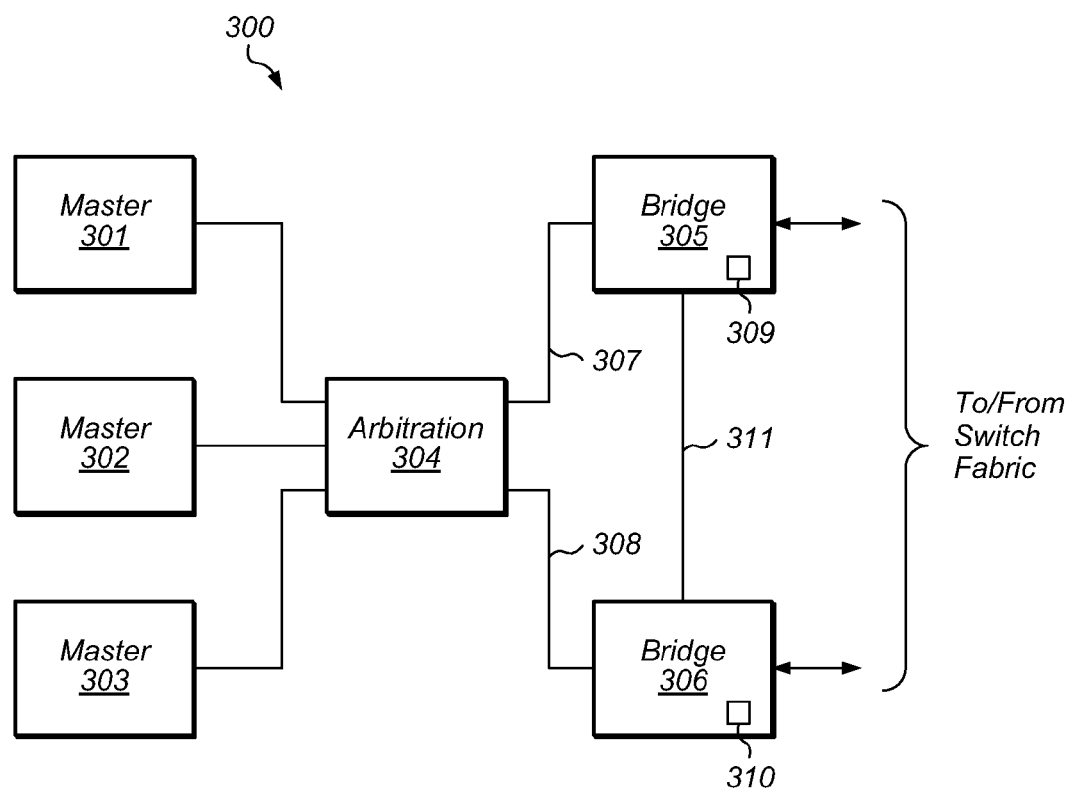
FIG. 3 illustrates an embodiment of a portion of a system including multiple masters communicating over multiple busses.

Turning to FIG. 3, an embodiment of a portion of a system, such as, e.g., SoC 100 as illustrated in FIG. 1, is illustrated. In the illustrated embodiment, system 300 includes master units 301 through 303, arbitration unit 304, and bridge units 305 and 306. Each of master units 301 through 303 are individually coupled to arbitration unit 304, which is, in turn, coupled to bridge units 305 and 306 through busses 307 and 308, respectively. Busses 307 and 308 may, in some embodiments, may each employ a different communication protocol. Bridge unit 305 is coupled to another communication bus (also referred to herein as a "switch fabric") that may be coupled to numerous functional blocks. In a similar fashion, bridge unit 306 is coupled the switch fabric.

Master units 301 through 303 may, in various embodiments, correspond to any of the functional blocks, such as, e.g., processor 101, as depicted in FIG. 1, and may be configured to send transactions to other functional blocks (or "agents") coupled to the switch fabric. The transactions may be sent through arbitration unit via either bus 307 or 308. In some embodiments, a given one of master units 301 through 303 may send transactions via both busses 307 and 308. Each transaction may include a command that an agent coupled to the switch fabric may execute. In some embodiments, a transaction may include a request for data or may include data that is to be stored in a memory or other similar storage circuit.

A master unit, such as, e.g., master units 301 through 303, may be configured to send fence (also referred to herein as "barrier") commands. Such fence commands may be employed to synchronize activities across different communication busses, such as, e.g., communication busses 307 and 308. In various embodiments, a fence command may signal a bridge unit to halt the transmission of further transactions into the switch fabric. A fence command may, in some embodiments, be a standalone command, or may include an additional command, such as, a read command or a write command, for example. In some embodiments, any transaction may be tagged as a fence command.

In some embodiments, arbitration unit 304 may be configured to select from transactions sent by master units 301 through 303, and relay the selected transaction to one of bridge units 305 and 306. The selected transaction may be formatted in accordance with one of various communication protocols. Arbitration unit 304 may select a given transactions from transactions sent by master units 301 through 303 in accordance with one of various arbitration schemes, such as, a round-robin scheduling algorithm, for example. In some embodiments, arbitration unit 304 may include temporary storage, such as, e.g., buffers or register files, and one or more multiplex circuits.

Each of bridge units 305 and 306 may, in various embodiments, may be configured to translate a transaction from one communication protocol to another. For example, bridge unit 305 may be configured to convert transactions received via bus 307 from the communication protocol employed on bus 307 to the communication protocol employed for the switch fabric. In some embodiments, each of bridge units 305 and 306 may also be configured to receive responses to transactions sent by one of master units 301 through 303. The responses to the transactions may be formatted using the communication protocol of the switch fabric, and bridge units 305 and 306 may convert the responses into a format compatible with their respective communication bus, in order to send the transaction response back to the originating master unit.

In some embodiments, bridge units 305 and 306 may track the number of transactions that have been sent to the switch fabric and the number of responses received, thereby determining a number of outstanding transactions. Bridge units 305 and 306 may, in various embodiments, include one or more counters such as, counters 309 and 310, respectively. Each of counters 309 and 310 may be incremented each time a transaction is received from arbitration unit 304, and decremented when a corresponding response is received from the destination agent via the switch fabric. While the above example describes the use of counters to track outstanding transactions, in other embodiments, different mechanisms to determine a number of outstanding transactions may be employed.

Bridge units 305 and 306 may, in some embodiments, be configured to communicate with each other via communication link 311. Although only a single wire is depicted in conjunction with communication link 311, any suitable number of wires may be employed in the communication link. In some embodiments, when a bridge unit receives a fence command, the bridge unit may hold the fence command, i.e., stall the processing of the fence command into a format for transmission on the switch network, and signal to other bridge units the receipt of the fence command via a receive signal included in the communication link.

A bridge unit may be further configured to assert a stall signal in the communication link indicating to other bridge units that there are outstanding transactions. Once a bridge unit has determined that there are no longer any outstanding transactions, the aforementioned stall signal may be de-asserted. In some embodiments, once all bridge units have determined that each bridge unit no longer has any outstanding transactions, each bridge unit may then complete the received fence command. When responses are received to the fence command, the receive signal in the communication link may be de-asserted, and the system may resume normal operation. In some embodiments, each bridge unit may send an additional signal to the master unit originating the fence command when the fence command is being completed. The additional signal may prevent the master unit from sending further transactions until the fence has completed. Once the fence has completed, each bridge unit may signal the master unit so that normal operation may resume.

It is noted that although the embodiment illustrated in FIG. 3 depicts two bridge units, in some embodiments, a single bridge unit may be used to process transactions. In such cases, the inputs of the single bridge unit normally coupled to communication link 311 may be tied to predetermined voltage or logic levels to ensure proper functioning of the single bridge unit. For example, in some embodiments, the fence received input of the single bridge unit may be connected to a logic 1 level and the stall signal input may be coupled to a logic 0 level.

Counters, such as those described herein, may be one example of a sequential logic circuit or state machine. In various embodiments, a counter may include one or more latches or flip-flop circuits coupled together to store state information. A counter may be incremented in a synchronous or asynchronous fashion, and may, in some embodiments, may be reset or loaded with a predetermined value.

It is noted that the portion of a system illustrated in FIG. 3 is merely an example. In other embodiments, different numbers of master units and bridge units are possible and contemplated.

Figure 4:
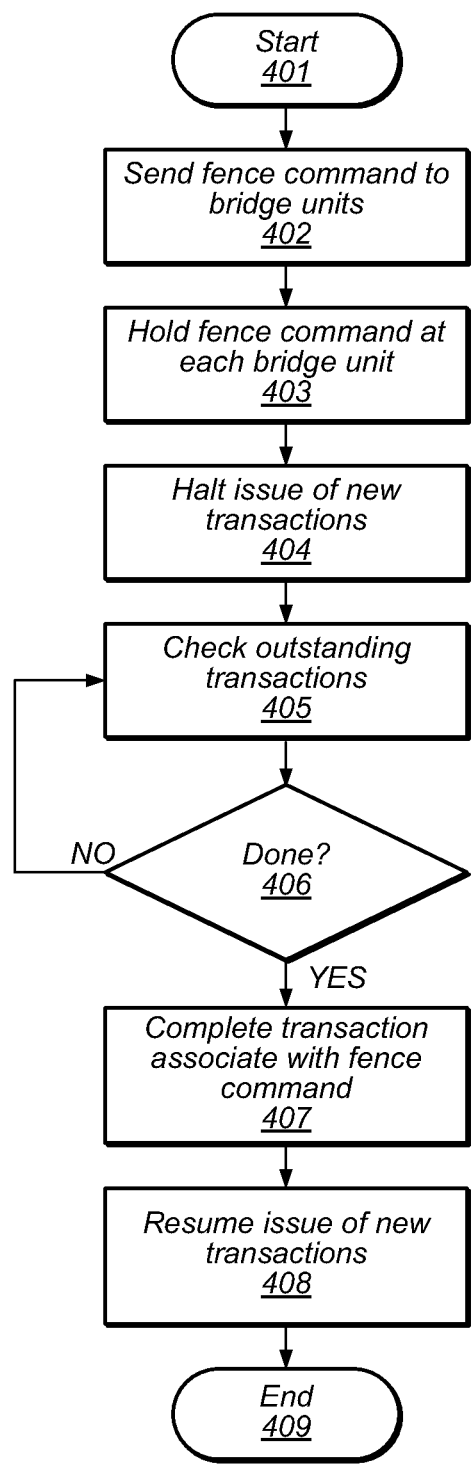
FIG. 4 illustrates a flowchart of an embodiment of a method for operating a system employing bridge circuits.

An example flowchart depicting an embodiment of a method for operating a system employing bridge circuits or units, is illustrated in FIG. 4. Referring collectively to the system illustrated in FIG. 3, and the flowchart of FIG. 4, the method begins in block 401. A fence command may then be sent to each of bridge units 305 and 306 (block 402). In some embodiments, the fence command may be sent from one of master units 301 through 303. A fence command may, in various embodiments, be an ordinary command, such as, e.g., read from or write to an agent connected to the switch fabric, that has been tagged. The tag may be interpreted by bridge units, such as, e.g., bridge unit 305, to interpret the command as a fence command.

Once the fence commands are sent and received at bridge units 305 and 306, the fence commands are held in their respective bridge units without being relayed to the switch fabric (block 403). The received fence commands may, in various embodiments, be stored in a memory or register file included within the bridge units 305 and 306. Upon receiving the fence command, bridge units 305 and 306 may halt further transmission of new transactions into the switch fabric (block 404). In some embodiments, one or more of bridge units 305 and 306 may signal to the master that originated the fence command, that the fence command has been received, and that the master should not issue further transactions for relaying to the switch fabric until the fence command has been completed.

Once the transmission of new transactions has been halted, bridge units 305 and 306 check the number of outstanding transactions (block 405). In some embodiments, each of bridge units 305 and 306 include a counter which may be incremented each time the bridge unit receives a transactions from a master unit to relay to an agent coupled to the switch fabric. Each counter may be decremented when a response is received from an agent, thereby providing a count for each bridge unit as to how many transactions are still awaiting a response.

The method may then depend on the number of outstanding transactions for each of bridge units 305 and 306 (block 406). When there are still transactions that have not received responses, each bridge unit again checks the number of outstanding transactions (block 405). The method may then continue from block 405 as described above.

When all outstanding transactions for both bridge units 305 and 306 have completed, the transaction associated with the fence command may then be completed (block 407). In some embodiments, each bridge unit may have different transaction associated with the fence command. Each transaction may be formatted to an appropriate communication protocol for its respective destination. The formatted transactions may then be sent onto their respective destinations. While awaiting responses from the formatted transactions, bridge units 305 and 306 may, in some embodiments, buffer incoming transactions from the master unit that originated the fence command, thereby preventing any additional transactions from being sent to their respective destinations. In other embodiments, bridge units 305 and 306 may signal the master unit that originated the fence command to not issue new transactions.

When a bridge unit receives a response to its respective transaction, the bridge unit may communicate to the other bridge units that it has received a response. In some embodiments, the communication with the other bridge units may be accomplished through de-asserting a respective received fence signal that was asserted upon receipt of the fence command by a given bridge unit. Once all of the bridge units have received responses to their respective fence related transactions, the processing of transactions may resume (block 408). The method may then conclude in block 409.

It is noted that the method depicted in the flowchart illustrated in FIG. 4 is merely an example. In other embodiments, different operations and different order of operations are possible and contemplated.

Figure 5:
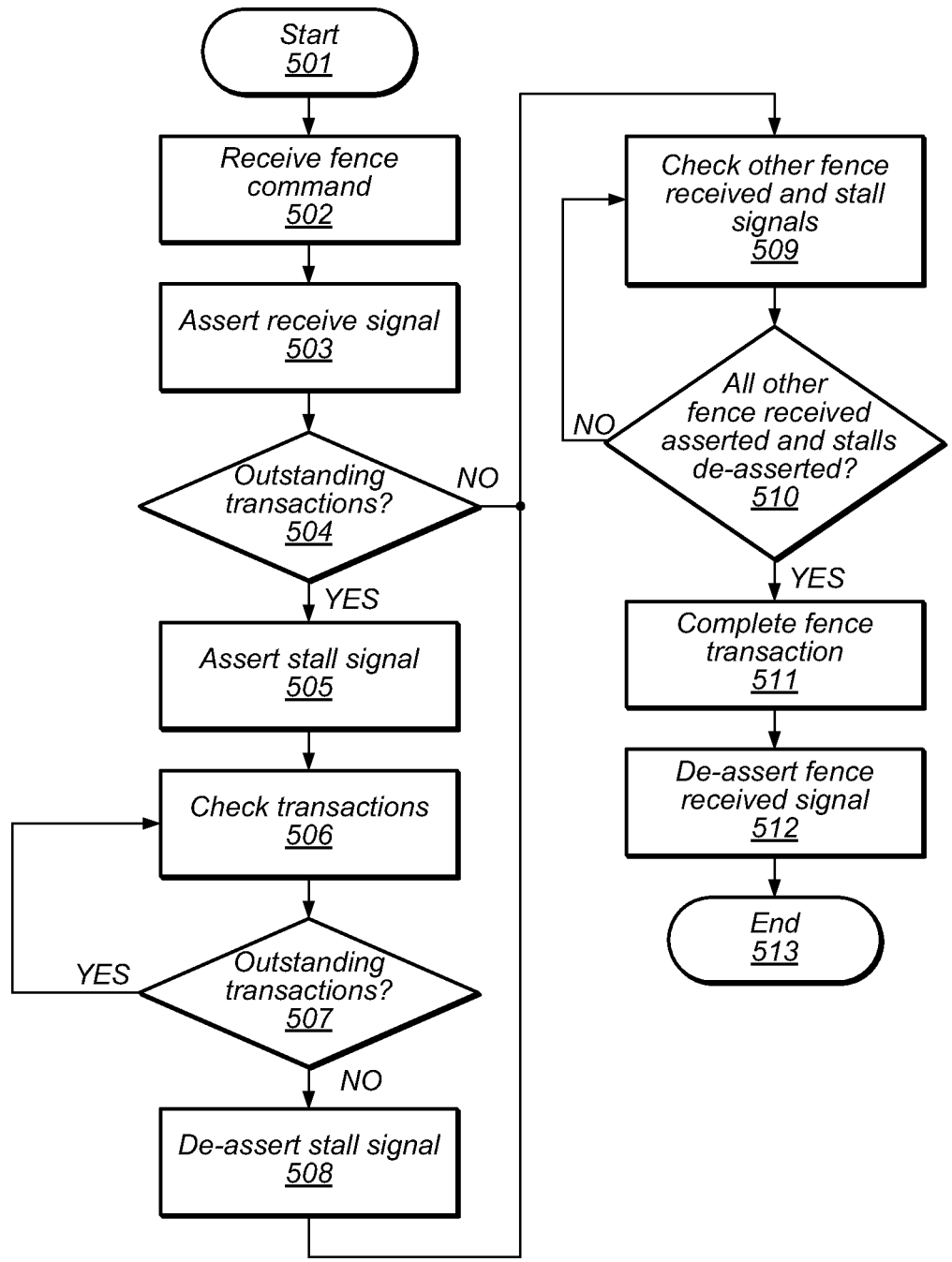
FIG. 5 illustrates a flowchart of another embodiment of a method for operating a system employing bridge circuits.

Turning to FIG. 5, a flowchart depicting a method for operating a bridge unit, such as bridge unit 305 as depicted in FIG. 3, is illustrated. Referring collectively to the portion of a system illustrated in FIG. 3 and the flowchart depicted in FIG. 5 the method begins in block 501. One of master units 301 through 303 may then send a fence command to bridge unit 305 (block 502). In some embodiments, the fence command may be transmitted to both bridge unit 305 and 306, and both bridge units were process the fence command in a similar fashion. For the purposes of illustration, the operation of only one of the bridge circuits is detailed in the following description of the method illustrated in FIG. 5.

Upon receipt of the fence command, bridge unit 305 may assert a fence received signal (block 503). In some embodiments, the fence received signal may be sent to other bridge units, such as, e.g., bridge unit 306, via a communication link such as, communication link 311, for example. Although only one other bridge unit is depicted in the embodiment illustrated in FIG. 5, it is noted that in other embodiments, additional bridge units, each receiving the fence stall signal, may be employed.

The method may then depend upon a number of outstanding transactions (block 504). In some embodiments, the number of outstanding transactions may be determined by checking a counter, such as, e.g., counter 309 as illustrated in FIG. 3. When there are outstanding transactions, bridge unit 305 may assert a stall signal (block 505). In some embodiments, the asserted stall signal may be sent to other bridge units within a system, such as, bridge unit 306, for example. With the stall signal asserted, bridge unit 305 may, in various embodiments, stop processing transactions, i.e., converting transactions from one communication protocol to another.

With the stall signal asserted and the processing of additional transactions halted, bridge circuit 305 may then check on the number of outstanding transactions (block 506). In various embodiments, bridge circuit 305 may employ a counter or any other suitable sequential logic circuit to determine the number of outstanding transactions. The method may then depend on the number of outstanding transactions (block 507). When a determination is made that outstanding transactions remain, bridge unit 305 checks the number of outstanding transactions again, and the method proceeds as described above from block 506.

When responses have been received from all pending transactions, and there are no longer any outstanding transactions, the stall signal may be de-asserted (block 508). With the stall signal de-asserted, bridge circuit 305 may check the status of stall signals and fence received signals from other bridge units, such as, e.g., bridge unit 306 (block 509). In various embodiments, stall signals from each of the bridge units may be logically combined such that each bridge unit receives a single signal indicating that at least one other bridge unit is still waiting for outstanding transactions to complete. Similarly, in some embodiments, fence received signals from each of the bridge units may be logically combined such that each bridge unit receives a single signal indicating that at least one other bridge units has still not yet received the fence command.

The fence transaction may, in some embodiments, arrive at bridge units 305 and 306 at different times. The variation in arrival time may be the result of arbitration delay through arbitration unit 304, congestion on one of busses 307 or 308, and the like. In such cases, by the time a given bridge unit detects the receipt of a fence command and determines that the given bridge unit has no pending transactions, other bridge units may not have yet received the fence command. To ensure proper processing of the fence transaction, the given bridge unit must wait until all other bridge units have received the fence command and asserted their respective fence received signals and that all other bridge units have determined that they do not have any pending transactions and de-asserted their respective stall signals before processing the fence command. By forcing each bridge unit to wait until all other bridge units have asserted the respective fence received signals and de-asserted their respective stall signals, a system may, in various embodiments, ensure that a fence command issued across multiple busses may be correctly processed.

The method may then depend on if other stall signals have been de-asserted and fence received signals have been asserted (block 510). When at least one stall signal is still asserted or at least one fence received signal is not yet asserted, bridge unit 305 again checks the status of the stall and fence received signals, and the method proceeds from block 509 as described above.

When all of the other stall signals have been de-asserted and the other fence received signals have been asserted, the transaction associated with the fence command may then be executed (block 511). In some embodiments, bridge units may signal to the master unit that originated the fence command that execution of the fence command is in progress. In such cases, the master unit may hold or stall the sending of further transactions to the bridge units until the transaction associated with the fence command has completed.

Dependent on queuing other pending transactions, each bridge unit may receive notification that the fence command has completed at different times. When a bridge unit, such as, e.g., bridge unit 305 receives a response to the transaction associated with the fence command, the bridge unit may de-assert the receive signal (block 512). In some embodiments, the master unit originating the fence may not resume the transmission of transactions to the bridge units until all of the bridge units has de-asserted their receive signal. Once the bridge unit has de-asserted its receive signal, the method may conclude in block 513.

Returning to block 504, when bridge unit 305 determines that there are no outstanding transactions, bridge unit 305 may check on the stall and fence received signals of other bridge units (block 509). The method may then proceed as described above from block 509.

In the method illustrated in FIG. 5, the operations are depicted as being performed in a sequential fashion. In other embodiments, one or more of the operations may be performed in parallel.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a master unit configured to generate a plurality of transactions;
   a first bridge unit coupled to the master unit, wherein the first bridge unit is configured to process a first portion of the plurality of transactions; and
   a second bridge unit coupled to the master unit, wherein the second bridge unit is configured to process a second portion of the plurality of transactions;
   wherein the master unit is further configured to transmit a fence command to the first bridge unit and the second bridge unit;
   wherein the first bridge unit is configured to:
      stall the processing of the received fence command; and
      execute the fence command responsive to a determination that the first portion and the second portion of the plurality of transactions have completed;
   wherein the second bridge unit is configured to:
      stall the processing of the received fence command; and
      execute the fence command responsive to a determination that the first portion and the second portion of the plurality of transactions have completed.

2. The apparatus of claim 1, wherein to stall the processing of the received fence command, the first bridge unit is further configured to assert a first fence received signal, and wherein to stall the processing of the received fence command the second bridge unit is further configured to assert a second fence received signal.

3. The apparatus of claim 1, wherein to stall the processing of the received fence command the first bridge unit is further configured to assert a first stall signal responsive to a determination that at least one transaction of the first portion of the plurality of transactions is pending, and wherein to stall the processing of the received fence command the second bridge unit is further configured to assert a second stall signal responsive to a determination that at least one transaction of the second portion of the plurality of transactions is pending.

4. The apparatus of claim 1, wherein to stall the processing of the received fence command, the first bridge unit is further configured to assert a first fence received signal, and wherein to stall the processing of the received fence command the second bridge unit is further configured to assert a second fence received signal, and wherein the first bridge unit is further configured to de-assert the fence received command response to a determination the first fence command has been processed, and wherein the second bridge unit is further configured to de-assert the second fence received command responsive to the determination the second fence command has been processed.

5. The apparatus of claim 1, wherein to determine the first portion of the plurality of transactions has completed the first bridge unit is further configured to check a value of a first counter, wherein the first counter is configured to track a number of outstanding transactions of the first portion of the plurality of transactions, and wherein to determine the second portion of the plurality of transactions has completed the second bridge unit is further configured to check a value of a second counter, wherein the second counter is configured to track a number of outstanding transactions of the second portion of the plurality of transactions.

6. The apparatus of claim 1, wherein each transaction of the first portion of the plurality of transactions is encoded with a first communication protocol, and wherein each transaction of the second portion of the plurality of transactions is encoded with a second communication protocol.

7. The apparatus of claim 1, wherein the first bridge unit is further configured to process the first portion and the second portion of the plurality of transactions, and wherein a fence received signal input of the first bridge unit is coupled to a logic 1 level and a stall signal input of the first bridge unit is coupled to a logic 0 level.

8. A method, comprising:
processing, by each bridge unit of a plurality of bridge units, a respective portion of a plurality of transactions;
receiving a fence command by each bridge unit of the plurality of bridge units;
stalling, by each bridge unit of the plurality of bridge units, the processing of the received fence command; and
executing, by each bridge unit of the plurality of bridge units, the received fence command responsive to a determination that each bridge unit has received the fence command and processed its respective portion of the plurality of transactions;
wherein each transaction of the respective portion of the plurality of transactions is encoded with a respective communication protocol, and wherein processing, by each bridge unit of the plurality of bridge units, the respective portion of the plurality of transactions comprises translating the respective communication protocol to a different communication protocol.

9. The method of claim 8, wherein receiving the fence command by each bridge unit of the plurality of bridge units comprises asserting a fence received signal by each bridge unit of the plurality of bridge units.

10. The method of claim 8, wherein stalling, by each bridge unit of the plurality of bridge units, the processing of the received fence command comprises sending a respective stall signal by a given bridge unit of the plurality of bridge units responsive to a determination that the given bridge unit has not completed processing its respective portion of the plurality of transactions.

11. The method of claim 8, wherein receiving the fence command by each bridge unit of the plurality of bridge units comprises asserting a fence received signal by each bridge unit of the plurality of bridge units, and further comprising de-asserting, by each bridge unit of the plurality of bridge units, the respective fence received signal responsive to the completion of the received fence command.

12. The method of claim 8, wherein stalling, by each bridge unit of the plurality of bridge units, the processing of the received fence command comprises sending a respective stall signal by a given bridge unit of the plurality of bridge units responsive to a determination that the given bridge unit has not completed processing its respective portion of the plurality of transactions, and wherein sending the respective stall signal by the given bridge unit of the plurality of bridge units comprises checking a counter.

13. The method of claim 12, wherein processing, by each bridge unit of the plurality of bridge units, the respective portion of the plurality of transactions comprises:
incrementing the counter responsive to receiving a given transaction of the respective portion of the plurality of transactions; and
decrementing the counter responsive to the given transaction of the respective portion of the plurality of transactions completing.

14. A system, comprising:
a master unit configured to generate a plurality of transactions, wherein each transaction of a first portion of the plurality of transactions is encoded with a first communication protocol, and wherein each transaction of a second portion of the plurality of transactions is encoded with a second communication protocol;
a first bridge unit coupled to the master unit via a first communication bus, wherein the first bridge unit is configured to:
receive the first portion of the plurality of transactions via the first communication bus; and
process a first portion of the plurality of transactions; and
a second bridge unit coupled to the master unit via a second communication bus, wherein the second bridge unit is configured to:
receive the second portion of the plurality of transactions via the second communication bus; and
process the second portion of the plurality of transactions;
wherein the master unit is configured to send a fence command to the first bridge unit and the second bridge unit;
wherein the first bridge unit is further configured to:
assert a first fence received signal response to receiving the fence command; and
stall the processing of the fence command dependent upon outstanding transactions from the first and second portions of the plurality of transactions;
wherein the second bridge unit is further configured to:
assert a second fence received signal response to receiving the fence command; and
stall the processing of the fence command dependent upon outstanding transactions from the first and second portions of the plurality of transactions.

15. The system of claim 14, wherein the first bridge circuit is further configured to execute the fence command responsive to a determination that all transactions of the first and second portions of the plurality of transactions have completed and that the first fence received signal and the second fence received signal have both been asserted, and wherein the second bridge circuit is further configured to execute the fence command response to a determination that all transactions of the first and second portions of the plurality of transactions and that the first fence received signal and the second fence received signal have both been asserted.

16. The system of claim 15, wherein the first bridge circuit is further configured to assert a first stall signal responsive to a determination that at least one of the first portion of the plurality of transactions is pending, and wherein the second bridge circuit is further configured to assert a second stall signal responsive to a determination that at least one of the second portion of the plurality of transactions is pending.

17. The system of claim 16, wherein to determine that all transactions of the first and second portions of the plurality of transactions have completed, the first bridge unit is configured to determine the second stall signal has been de-asserted and the second fence received signal has been asserted, and wherein to determine that all transaction of the first and second portions of the plurality of transactions have completed, the second bridge unit is configured to determine the first stall signal has been de-asserted and the first fence received signal has been asserted.

18. The system of claim 14, wherein to determine that all transactions of the first and second portions of the plurality of transactions have completed the first bridge unit is further configured to check a first counter, wherein the first counter is configured to track a number of outstanding transactions of the first portion of the plurality of transactions, and wherein to determine that all transaction of the first and second portions of the plurality of transactions have completed the second bridge unit is further configured to check a second counter, wherein the second counter is configured to track a number of outstanding transactions of the second portion of the plurality of transactions.

19. The system of claim 14, wherein to process the first portion of the plurality of transactions the first bridge unit is further configured to translate each transaction of the first portion of the plurality of transactions from the first communication protocol to a third communication protocol, and wherein to process the second portion of the plurality of transactions the second bridge unit is further configured to translate each transaction of the second portion of the plurality of transactions from the second communication protocol to the third communication protocol.

* * * * *